US008086952B2

(12) United States Patent
Edd et al.

(10) Patent No.: US 8,086,952 B2
(45) Date of Patent: Dec. 27, 2011

(54) AUTOMATED MANAGEMENT OF INTERNET AND/OR WEB SITE CONTENT

(75) Inventors: Linda D. Edd, Rochester, MN (US); Terry Charles Lambert, Rochester, MN (US); Timothy Jerald McQuire, Elgin, MN (US); Thomas Alan Shore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 11/871,225

(22) Filed: Oct. 12, 2007

(65) Prior Publication Data

US 2008/0034275 A1 Feb. 7, 2008

Related U.S. Application Data

(62) Division of application No. 09/871,920, filed on Jun. 1, 2001, now Pat. No. 7,325,193.

(51) Int. Cl.
*G06F 17/00* (2006.01)

(52) U.S. Cl. ....................................................... 715/229

(58) Field of Classification Search .................. 715/229
See application file for complete search history.

(56) References Cited

U.S. PATENT DOCUMENTS

| | | | |
|---|---|---|---|
| 5,625,818 A | 4/1997 | Zarmer et al. | |
| 5,671,428 A | 9/1997 | Muranaga et al. | |
| 5,678,041 A | 10/1997 | Baker et al. | |
| 5,684,984 A | 11/1997 | Jones et al. | |
| 5,706,452 A | 1/1998 | Ivanov | |
| 5,987,402 A * | 11/1999 | Murata et al. | 704/2 |
| 6,088,702 A | 7/2000 | Plantz et al. | |
| 6,122,647 A | 9/2000 | Horowitz et al. | |
| 6,139,201 A * | 10/2000 | Carbonell et al. | 704/2 |
| 6,185,587 B1 | 2/2001 | Bernardo et al. | |
| 6,424,979 B1 | 7/2002 | Livingston et al. | |

(Continued)

FOREIGN PATENT DOCUMENTS

WO 99/66425 A1 12/1999

OTHER PUBLICATIONS

Title: Controlling and Restricting Access to Web Pages on NERSP, Date: Feb. 23, 2000, URL:<http://docweb.cns.ufl.edu/docs/d0123/d0123.html>.*

(Continued)

*Primary Examiner* — Laurie Ries
*Assistant Examiner* — Mustafa Amin
(74) *Attorney, Agent, or Firm* — Wood, Herron & Evans, LLP

(57) ABSTRACT

Content is managed in a content-controlled database by detecting a modification made to a first country version of a content item in the content-controlled database, and automatically initiating a review of a second country version of the content item in the content-controlled database in response to detecting the modification of the first country version. Automatically initiating the review of the second country version includes demoting the second country version to restrict the content item from being user accessible from the content-controlled database. Prior to the automatically initiated review the second country version is accessible to end users of a web site that uses the content-controlled database, and demoting the second country version includes restricting access to the second country version by end users via the web site until after approval of the second country version is obtained via the automatically initiated review.

15 Claims, 8 Drawing Sheets

U.S. PATENT DOCUMENTS

| | | | |
|---|---|---|---|
| 6,505,212 B2 | 1/2003 | Nakano et al. | |
| 6,505,300 B2* | 1/2003 | Chan et al. | 713/164 |
| 6,623,529 B1* | 9/2003 | Lakritz | 715/205 |
| 6,931,415 B2 | 8/2005 | Nagahara | |
| 7,035,910 B1* | 4/2006 | Dutta et al. | 709/217 |
| 7,054,885 B1* | 5/2006 | Hoffman et al. | 1/1 |
| 7,111,057 B1* | 9/2006 | Sherman et al. | 709/223 |
| 7,325,193 B2 | 1/2008 | Edd et al. | |
| 7,447,989 B2 | 11/2008 | Rousselle et al. | |
| 7,711,708 B2* | 5/2010 | Bergstraesser et al. | 707/638 |
| 2002/0010798 A1* | 1/2002 | Ben-Shaul et al. | 709/247 |
| 2002/0029351 A1* | 3/2002 | Deng | 713/201 |
| 2002/0087603 A1* | 7/2002 | Bergman et al. | 707/517 |
| 2002/0107886 A1* | 8/2002 | Gentner et al. | 707/511 |
| 2002/0161597 A1 | 10/2002 | Klibaner | |
| 2009/0319544 A1* | 12/2009 | Griffin et al. | 707/100 |

OTHER PUBLICATIONS

"Going mobile: Hummingbird's latest document manager frees users from network", KMWorld Conference Preview, vol. 9, Issue 6, p. 3, (Jul./Aug. 2000).

Reeves, Daniel M. et al., Automated negotiation from declarative contract descriptions, May 2001, ACM International Conference on Autonomous Agents, pp. 51-58.

Pitkow, et al., "Towards an Intelligent Publishing Environment", Computer Networks and ISDN Systems, North Holland Publishing, vol. 27, No. 6, Apr. 1995.

"Seybold Report on Publishing Systems", vol. 23, No. 7, Dec. 1, 1993, M. Walter, "Documentum: Open Approach to Automating Workflow and Management of Long Documents".

U.S. Patent and Trademark Office, Office Action issued in related U.S. Appl. No. 09/871,920, dated Mar. 1, 2005.

U.S. Patent and Trademark Office, Final Office Action issued in related U.S. Appl. No. 09/871,920, dated Aug. 16, 2005.

U.S. Patent and Trademark Office, Notice of Allowance issued in related U.S. Appl. No. 09/871,920, dated Sep. 10, 2007.

U.S. Patent and Trademark Office, Examiner's Answer issued in related U.S. Appl. No. 09/871,920, dated May 5, 2006.

United States Patent and Trademark Office Board of Patent Appeals and Interferences Decision issued in related U.S. Appl. No. 09/871,920 dated Apr. 2, 2007.

* cited by examiner

CONTENT MANAGEMENT DOCUMENT

| | | | |
|---|---|---|---|
| DOCUMENT NUMBER: | 21590257 | NEW AUTHOR: | NEW AUTHOR |
| CONTENT AUTHOR: | JOHN DOE/IBM | NEW AUTHOR: | NEW AUTHOR |
| CREATED ON: | 2001/1/1 12:02A | CONTENT CATEGORY: | MARKETING |
| STATUS: | REVIEW | TOPIC OWNER: | JIM SMITH/IBM |
| DATE OF LAST STATUS: | 2001/1/2 | NEXT ACTION REQ'D BY: | JIM SMITH/IBM |
| NATIONAL LANG. VERS. | RELATED DOCS | | |

INSTRUCTIONS

IS THIS A SPECIAL PROCESSING ITEM? ○ YES ● NO

HELP  STEP 1 - SELECT A TOPIC AREA

| | | |
|---|---|---|
| TOPIC: | | WHITE PAPERS |
| INDUSTRY: | | NOT INDUSTRY SPECIFIC |
| COUNTRY PAGES: | | WORLD WIDE PAGE |

HELP  STEP 1A - NOTIFY OTHER TOPIC OWNERS

| | | |
|---|---|---|
| OTHER TOPICS: | | OTHER TOPICS |
| SHOPPING SITE: | | ○ YES ● NO |
| SYSTEM SALES: | | ○ YES ● NO |
| PARTNER INFO: | | ○ YES ● NO |

HELP  STEP 2 - DESCRIBE YOUR WEB PAGE

| | | |
|---|---|---|
| TITLE: | | SERVER WHITE PAPERS |
| SHORT SUMMARY: | | READ WHAT EXPERTS HAVE TO SAY ABOUT KEY TOPICS -- AND CHECK OUT... |
| KEYWORDS: | | WHITE PAPERS, SERVER |
| INTERNATIONAL CONTENT: | | ○ YES ● NO |

FIG. 4A

| HELP | STEP 3 - DEFINE WHEN YOUR PAGE(S) ARE PUBLISHED, REVIEWED, AND REMOVED |
|---|---|
| WEB PUBLICATION DATE: 162 | ○ WHEN APPROVED ● SPECIFY DATE |
| PUBLICATION DATE: 164 | 2001/2/1 |
| REVIEW DATE: 166 | 2001/7/1 |
| EXPIRATION DATE: 168 | 2001/8/1 |

160

| HELP | STEP 4 - DETERMINE IF LEGAL SHOULD REVIEW YOUR PAGE(S) |
|---|---|
| HAS CONTENT BEEN APPROVED BY LEGAL? 172 | ○ YES ● NO |
| NAME OF LEGAL APPROVER 174 | MIKE JONES/IBM |
| COMPARATIVE OR NEGATIVE REFERENCES TO COMPETITORS OR RELATIVE STRENGTHS/WEAKNESSES OF NON-IBM PRODUCTS? | ○ YES ● NO |
| UNNANOUNCED PRODUCTS, STATEMENT OF DIRECTION, OR CONFIDENTIAL OR SIMILAR INFORMATION OF IBM OR THIRD PARTY? | ○ YES ● NO |
| PERFORMANCE CLAIM FOR AN IBM PRODUCT? 180 | ○ YES ● NO |
| UNANNOUNCED IBM PRODUCTS, PRICES OR TERMS? 182 | ○ YES ● NO |
| MARKET SHARE OR RELATIVE STRENGTHS AND WEAKNESSES OF IBM OR ANOTHER COMPANY? 184 | ○ YES ● NO |

170, 176, 178

| HELP | STEP 5 - LIST THE FILES BEING ADDED, CHANGED OR DELETED 192 |
|---|---|
| FILES ADDED/CHANGED: | /WHPAPR/INDEX.HTM, /WHPAPR/RSWPM13002401F.HTM, /WHPAPR/PDF/RSWPM13002401F.PDF |

190

| HELP | STEP 6 - ENTER YOUR CONTENT 196 |
|---|---|
| ADD THE FOLLOWING WHITE PAPER:<br>TITLE: IBM SERVER ADVANTAGE: ON THE CUTTING EDGE OF NEXT GEN E-BUSINESS<br>CONTENT OWNER: JOHN DOE/IBM<br>SOURCE FILES: RSWPM13002401F.HTM, RSWPM13002401F.PDF | |

194

| HELP | ADD COMMENTS | STEP 7 - ENTER COMMENTS OR SPECIAL INSTRUCTIONS 200 |
|---|---|---|
| INITIALS-DATE-COMMENTS 202 | | |
| JIM SMITH/IBM - 2001/1/2 - BROKEN LINK FOUND AT LINE 7, ADD LINK TO SHOPPING SITE, PLEASE FIX AND RESUBMIT | | |

| HELP | STEP 8 - LIST YOUR CONTACT INFORMATION | 212 |
|---|---|---|
| YOUR EXTERNAL PHONE NUMBER: | 507-555-0021 | |
| YOUR INTERNAL PHONE NUMBER: | 555-0021 | |
| YOUR FAX NUMBER: | 507-555-1234 | |

STEP 9 - SUBMIT YOUR CONTENT

ROLE-SPECIFIC CONTROLS (FIGS. 5-10)

GENERATE META DATA

```
<HTML>
<HEAD>
<TITLE> SERVER WHITE PAPERS </TITLE>
<META HTTP-EQUIV = "TITLE" CONTENT = "SERVER WHITE PAPERS">
<META NAME = "DESCRIPTION" CONTENT = "READ WHAT EXPERTS HAVE...
   o
   o
   o
```

DEVELOPMENT: ENTER THE URL FOR THE CONTENT ON SERVER:

URL:
HTTP://EXAMPLE.IBM.COM:8080/WHPAPR/INDEX.HTM

DEVELOPMENT: LIST ALL FILES FOR THIS CONTENT ITEM:

PATH/FILE NAMES:
/WHPAPR/INDEX.HTM, /WHPAPR/RSWPM13002401F.HTM,
/WHPAPR/PDF/RSWPM13002401F.PDF, /WHPAPR/OWN.HTM, /WHPAPR/V4R1.HTM,...

ACTIVITY LOG:

| TOPIC OWNER APPROVAL BY: | | |
|---|---|---|
| LEGAL APPROVAL BY: | | |
| DEVELOPER APPROVAL BY: | | |
| FINAL APPROVAL BY: | | |
| SUBMITTED BY: | JOHN DOE/IBM | 2001/1/1 12:02A |

FIG. 4C

AUTOMATED MANAGEMENT OF INTERNET AND/OR WEB SITE CONTENT

CROSS-REFERENCE TO RELATED APPLICATIONS

This application is a divisional of U.S. patent application Ser. No. 09/871,920 filed on Jun. 1, 2001 by Linda D. Edd et al., which application is incorporated by reference herein in its entirety.

FIELD OF THE INVENTION

The invention is generally related to the management of electronic content, in particular, to the management of electronic content organized into a website and accessible via a network such as the Internet.

BACKGROUND OF THE INVENTION

The Internet has grown at a remarkable pace, and has become firmly entrenched in nearly all aspects of society. Whereas the Internet initially was limited to purely academic and government endeavors, the Internet has now become an important avenue of commercial activity, not to mention an important source of educational, commercial and entertainment-related information. Moreover, in addition to simply operating as a source of information, the Internet provides a mechanism for bringing together entities from across the globe. As an example, for business enterprises, the Internet provides the ability to interact electronically with customers, as well as suppliers, distributors and other business partners.

An important component of the Internet is the World Wide Web, or simply "the Web", which supports a client-server protocol where information is exchanged between end users (clients) and various interconnected servers, predominantly in the form of Hypertext Transfer Markup Language (HTML) files (also referred to as documents or pages). HTML files often include or reference textual information as well as graphics, icons, images, sound, video, and/or executable programs. HTML files are typically linked to one another via hypertext links, so that a user viewing one file can select a hypertext link in that file to initiate the retrieval of another file. Often, related files, or files managed by the same enterprise, are organized together into a web "site," with the related files generally stored on the same server or on a commonly-owned group of servers.

As the Internet has grown more sophisticated, web sites have become more complex, comprehensive and extensive in scope. In addition, for a business enterprise, a web site has become somewhat of a "front door" to customers and business partners, such that a customer's or partner's initial impressions about the web site can reflect directly on how they perceive that enterprise. As such, the quality, accuracy, completeness of the information, or "content", presented on a web site, as well as the functionality and navigability of the web site, can have a significant effect on customer and business partner relations. As a result, substantial resources are often expended in ensuring that the content of a web site is accurate, current, complete, and easily accessed.

Moreover, as with any published content (whether electronic or non-electronic in nature), web site content can potentially expose an enterprise to significant legal liability. For example, marketing claims made on a web site can raise concerns with respect to false or misleading advertising claims and improper disparagement of competitive products or services. Moreover, certain information may be confidential and not appropriate for general viewing on a web site, e.g., if intellectual property rights are involved, or if the information is covered by non-disclosure obligations to business partners or customers. Adequate safeguards therefore must often be implemented to ensure that web site content avoids unnecessary exposure to legal liability for an enterprise.

An example of a typical commercial web site might be a web site related to a line of server computers offered by an enterprise. On such a web site, it would not be uncommon to find information such as marketing and product information, accessory, peripheral and software information, product support information, technical information, etc. In addition, such a web site may include executable programs available for download (e.g., patches and upgrades), user forums, and an e-commerce system that supports the purchase of equipment, accessories and software. Such a web site may also include some mechanism for contacting an enterprise, e.g., for customer support or sales issues. Some web sites of this nature may also include comparative advertising information that compares an enterprise's line of servers to those of its competitors.

Creating a web site of such a magnitude is often a daunting task, and typically requires the collaboration of a number of authors that create content, web developers that format the content into appropriate HTML documents with a consistent look and feel, and various managers and reviewers that ensure content accuracy, currency and compliance with legal requirements. Particularly when a web site is related to a wide variety of topics, the various individuals involved in creating the web site may require different backgrounds and expertise. Thus, for example, a web site regarding a line of servers might require authors, reviewers, etc. experienced in different fields such as hardware, software, marketing, technical support, etc.

Moreover, web sites are typically extremely dynamic in nature, and are often updated with new content on a frequent basis, e.g., to incorporate new product releases, new support issues, new pricing structures, etc. As a result, the content presented in a web site will typically be in a constant state of flux.

Given the significant manpower resources required to create and update a web site, management of a web site, in general, is often cumbersome and extremely manually-intensive. Given also the large number of individuals that may be involved with various aspects of web site development and updating, interfacing the various individuals to ensure that all content is accurate and up-to-date is often haphazard and inefficient. To date, only a few automated tools, with rather limited utility, have been made available to assist web site managers in managing the content in their web sites.

Therefore, a significant need exists in the art for a more structured and automated manner of actively managing web site content, in particular, to reduce management overhead through improved collaboration between the individuals involved in web site creation, development and management.

SUMMARY OF THE INVENTION

The invention addresses these and other problems associated with the prior art by providing an apparatus, program product, and method in which content from a content-controlled database (e.g., web pages or other files maintained in a web site) is managed using a content management record linked to each content-controlled content item in the database. Each content management record is utilized in conjunction with a multi-stage content management process, where at least one stage is a review stage during which approval of an associated content item for a content management record is obtained. As a result of receiving appropriate approval, such an associated content item may be promoted and made available to users of the content-controlled database, with the content management record updated to reflect such a status of the associated content item.

In various embodiments consistent with the invention, content is managed in a content-controlled database by detecting a modification made to a first country version of a content item in the content-controlled database, and automatically initiating a review of a second country version of the content item in the content-controlled database in response to detecting the modification of the first country version. The first and second country versions of the content item are respectively linked to first and second content management records, each of which including content management information associated with the country version of the content item linked thereto. Detecting the modification is performed during processing of the first country version of the content item through a plurality of stages of a content management process, and the content management information stored in the first content management record is updated during each stage of the content management process. Automatically initiating the review of the second country version includes demoting the second country version to restrict the content item from being user accessible from the content-controlled database. In addition, prior to the automatically initiated review the second country version is accessible to end users of a web site that uses the content-controlled database. Demoting the second country version includes restricting access to the second country version by end users via the web site until after approval of the second country version is obtained via the automatically initiated review.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 4A-4C illustrate an exemplary content management document consistent with the invention.

DETAILED DESCRIPTION

Figure 1:
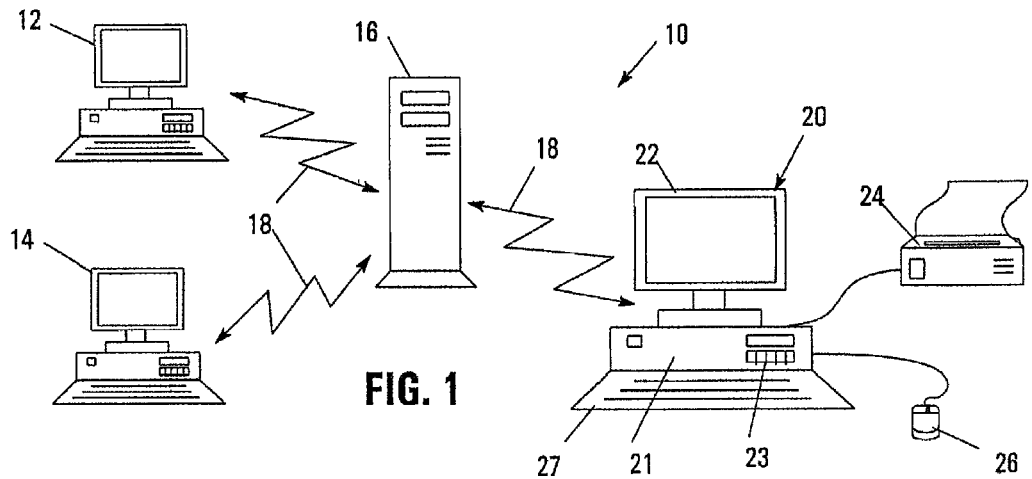
FIG. 1 is a block diagram of a networked computer system incorporating a content management system consistent with the invention.

The embodiments described herein utilize a unique content management system to control user access to a content-controlled database. Content management records, typically separate from the content items being controlled, are linked to the content items and updated during a multi-stage content management process to reflect the current status of any associated content items. Within the content management process, at least one stage incorporates a review process whereby approval of a content item is obtained. Any approved content item is thereafter promoted such that such content item is available to users of the content controlled database.

A content-controlled database may be implemented using any type of data repository or group of repositories where it is desired to limit what at least certain users of the repository are able to access. For example, in the implementation discussed hereinafter, a content-controlled database is used to store information from a web site or collection of web sites that are accessible via the Internet, or alternatively, via an intranet, extranet, or other form of network. Moreover, a content-controlled database need only limit availability of content to a certain class of users of the database, up to and including all possible database users. For example, for a publicly-accessible web site, the users that are limited to accessing the database may be persons that access the database who do not have heightened security rights (as might be had by developers, reviewers, or authors of the web site). It will be appreciated, however, that the invention may be utilized in other environments, and as such, the invention is not limited to the particular controlled-content web site implementation discussed herein.

Moreover, a content item in the context of the invention may include any type of data structure (e.g., a document, a file, a page, etc.) capable of storing information utilized in a content-controlled database (e.g., information formatted as text, images, graphics, sounds, videos, icons, animations and/or executable program code). Furthermore, a content management record consistent with the invention may be implemented as any form of data structure capable of being linked to one or more content items, and capable of storing information utilized in managing the availability of such content items to relevant users. In the embodiments discussed hereinafter, content management records are implemented as groupware documents that are linked via unidirectional or bidirectional links to associated content items. Furthermore, through the use of a groupware-type environment, collaborative tools such as document sharing and messaging may be used to facilitate the interaction among members of a content creation, development and management team during the various stages of the content management process, with the groupware-implemented content management documents utilized during the content management process to maintain appropriate content management information such as status and the like.

As will also become more apparent below, dynamic management of content items may be facilitated through an automated monitoring process whereby content items are periodically scheduled for review after they have been made available to users, typically after a review date associated with a content management record has been reached. Moreover, if a review is not completed within a set period of time, a content item may be automatically demoted to a non-available status to restrict its accessibility to users after that period of time.

As will also become more apparent below, multiple language and/or country versions of a content item may be linked together, such that changes made to one language/country version of a content item may automatically prompt a review of other versions to ensure that the changes are propagated as necessary. In particular, a main language/country content item may be linked to one or more child, secondary language/country items, with automated functionality used to notify parties responsible for child content items of any changes made to a parent content item.

Turning now to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

In the embodiments discussed hereinafter, content management consistent with the invention is typically implemented within a server-type computer such as computer 16, which may or may not be the same computer upon which is resident a web site or other content-controlled database. Client computers 12, 14 and 20 are typically the computers through which users interact with the content-controlled database, whereby if the content-controlled database stores a web site, the networks 18 typically represent Internet and/or intranet network connections. One or more of client computers 12, 14 and 20 may also be used by members of a content management team that control the content of a content-controlled database, such that direct user input to server computer 16 may not be required.

Figure 2:
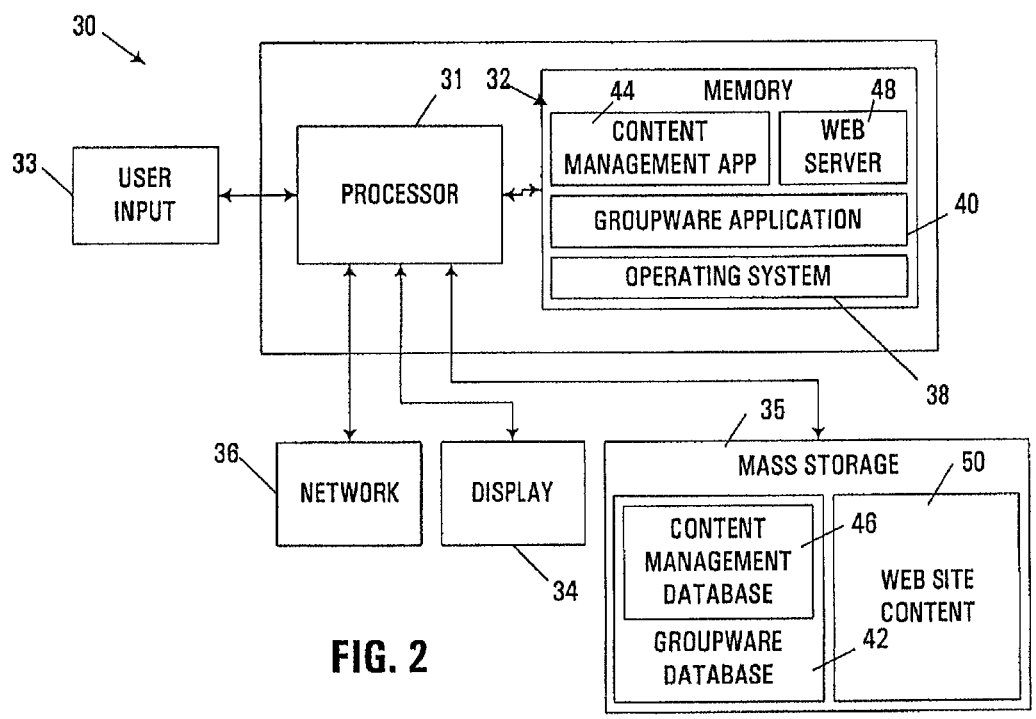
FIG. 2 is a block diagram of a computer from the networked computer system of FIG. 1, and incorporating a content management system consistent with the invention.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). Otherwise, user input may be received via another computer interfaced with computer 30 over network 36.

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., operating system 38, groupware application 40, groupware database 42, content management application 44, content management database 46, web server 48, and web site content 50, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Now turning to the specific groupware-based embodiment of a content management system consistent with the invention, FIG. 2 illustrates that a groupware application 40 and groupware database 42 are respectively used as the underlying operating environment for a content management application 44 and content management database 46. In the illustrated embodiment, a groupware application such as Notes, available from Lotus Development Corporation, a subsidiary of International Business Machines Corporation, is used to implement the underlying environment for providing content management functionality. It will be appreciated that one of ordinary skill in the art having the benefit of the instant disclosure would be able to implement the herein-described functionality in a Lotus Notes environment. Moreover, one of ordinary skill in the art having the benefit of the instant disclosure will appreciate that other underlying operating environments and applications may be used to implement the functionality described herein. Moreover, any combination of off-the-shelf and/or proprietary applications may be used to implement such functionality, including various commercially-available groupware, electronic messaging, document management, knowledge management, and database applications.

Figure 3:
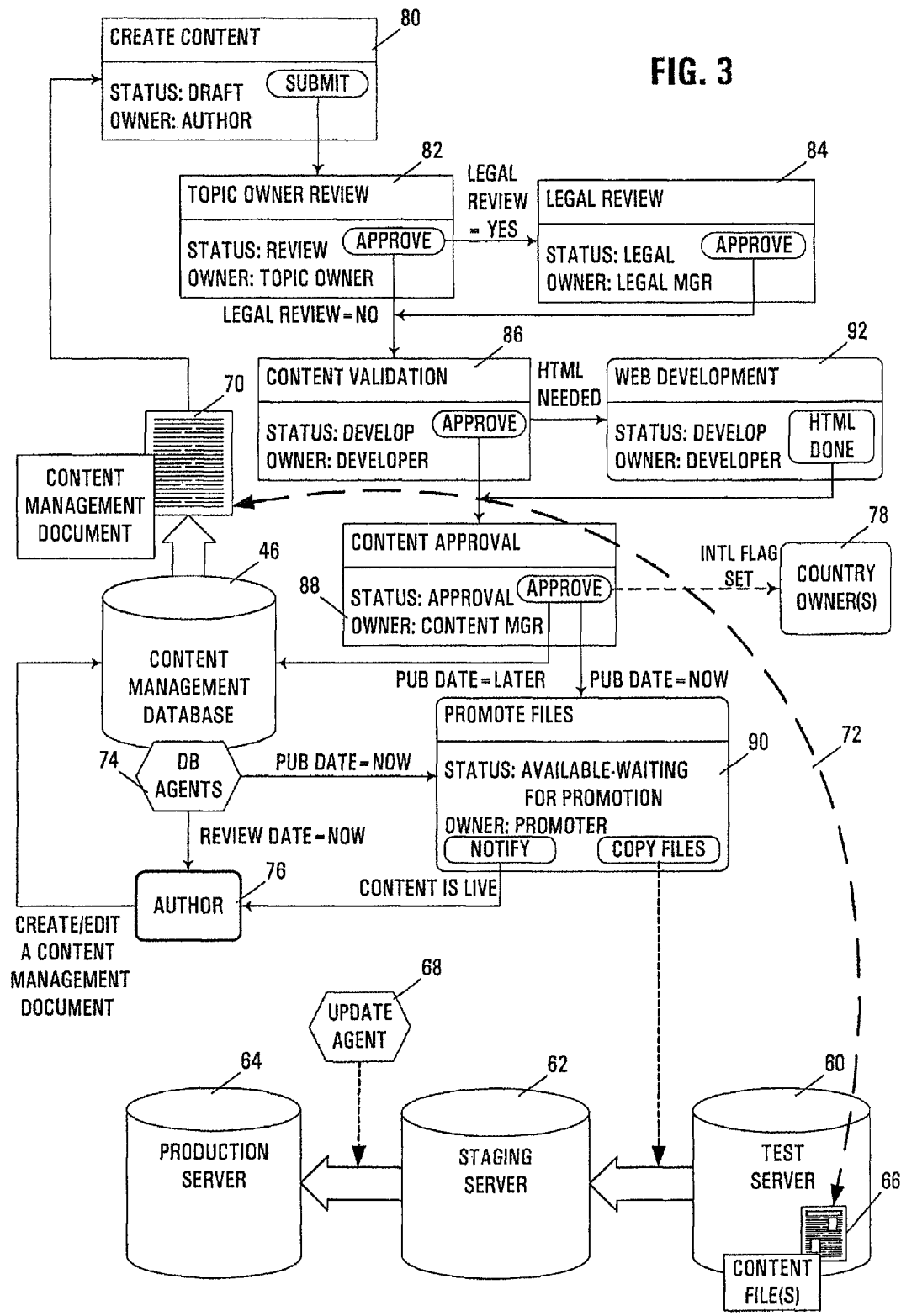
FIG. 3 is a block diagram illustrating the content management system of FIG. 2, and showing the various stages in a content management process consistent with the invention.

The content management system described herein is utilized to control user access to content such as web site content 50 that is accessible to users via a web server 48. In this context, control over the access to content is made by controlling what content is placed on a publicly-accessible area of a web site. More specifically, as illustrated in FIG. 3, a web site may be maintained on a series of servers, including a test server 60, a staging server 62 and a production server 64. Typically, web site content such as a content file 66 is initially stored by an author or other authorized person on a test server 60. Then, using the content management system described herein, files are copied over to a staging server 62 (typically by a "promoter" or other entity with heightened security rights) once such files have become approved for being made available to other users. An automated update agent 68 then periodically synchronizes staging server 62 with a production server 64 that is read accessible by all users. Typically, write access to the production server is restricted, with write access to the staging server limited to a limited group of users. As such, any changes made to a staging server will be automatically made to the production server once the update agent synchronizes the servers.

In the context of the invention, therefore, a content-controlled content item is "promoted" when it is made available for access by users for which access is restricted on non-promoted content items. Conversely, the description hereinafter may also refer to the concept of "demoting" a content item, which may incorporate removing the content item from availability. In the illustrated embodiment, promotion therefore encompasses copying an item to the staging server, while demotion encompasses removing the item from the staging server. In other embodiments, e.g., where no staging server is used, the copying/removing of an item from a production server may correspond to promotion/demotion consistent with the invention.

It will be appreciated that the concept of a "server" in the context of a web site may refer to one or more physical computers. Moreover, any particular server may also logically share the same physical hardware as another server. Thus, the illustration of servers 60-66 as shown in FIG. 3 is not meant to specify any particular hardware arrangement.

Now turning to an exemplary implementation of a content management process consistent with the invention, FIG. 3 illustrates an exemplary content management record or document 70 stored in content management database 46 and linked via a bidirectional link 72 to one or more of content files 66 stored on test server 60. A series of database agents 74 are illustrated as operating upon database 46 to perform various monitoring functions for the content management system. Also illustrated is an author 76 and one or more country owners 78, each of which representing entities that may interact with the content management system during the course of managing content consistent with the invention.

A content management system consistent with the invention permits collaboration between a number of entities that together may act as a content management "team". For example, an author refers to an entity that creates a content item. In some instances, an author may also perform some development tasks, e.g., performing all or a portion of the HTML coding required for formatting the content item for inclusion on a web site.

A reviewer refers to an entity that reviews a content item and either approves or disapproves of the content item based upon such a review. A reviewer may be a topic owner who reviews content items associated with particular topics, e.g., particular technology areas, business areas, marketing programs, etc. A reviewer may also be a legal representative or manager who reviews content items for compliance with legal requirements and/or to identify potential liability issues associated with content items, e.g., inappropriate disclosure of confidential material, advertising claims, products liability claims, consumer claims, trademarks, etc. A reviewer may also be a manager who has primary responsibility for web site content, and whose responsibility can overlap multiple fields, including with respect to content, legal issues, formatting issues, etc. A reviewer may also be a country or language owner who has responsibility for performing any of the above-described review functions on behalf of a particular country, geographic region or language, particularly where a web site maintains support for content appropriate for different regions of the world.

Another entity is a developer, who typically is responsible for performing any necessary formatting and/or coding of a content item so as to put the content item in suitable condition for incorporation into a web site. A related entity, which may be the same entity or different individuals that share overlapping responsibility, is a promoter, who is typically responsible for adding, deleting and/or modifying content items stored on the staging server (assuming the update agent updates the production server accordingly).

Another concept relevant to content management as described herein is status, given that a status is maintained for every content item. In the illustrated embodiment, the following statuses are supported:

draft: content item not yet reviewed.
    review: content item currently under review.
    legal: content item approved by topic owner(s), currently under legal review.

develop: content item has been reviewed and approved by legal manager, currently awaiting HTML coding.

approval: content item has been HTML coded, currently awaiting approval by web site content manager.

available-waiting for promotion: content item has been approved by content manager and is ready to be immediately promoted to "production" (i.e., copied to staging server and then to production server in due course).

available-promoted: content item has been promoted.

available-hold: content item has been approved by content manager and will be ready to be promoted to "production" once a specified date and/or time is reached.

As discussed above, in the illustrated embodiments the content management process and all communications between entities remain separate from the actual content that is being managed. This allows for greater flexibility when implementing changes in the process and managing content in different domains (i.e., stored in different databases). A document number or other identifier is assigned to each content management document, which in this implementation is a Lotus Notes document that contains content management information about the content file(s) (e.g., owner, topics, dates, etc.). In turn, much of the content management information is reproduced (as meta data) in every content item that is controlled by this document. Likewise, every content item filename is listed in the content management document. As such, bidirectional links are typically defined between content management documents and the content files. Unidirectional links, as well as other linking mechanisms (e.g., pointers, numbers, UID's, tokens, look-up tables, etc.), may be used in the alternative.

The content management system monitors these content management documents and alerts various entities when different actions are necessary, thus ensuring the content managed by this workflow process is kept current and fresh. Within the workflow process, a number of stages are defined, and are respectively illustrated in blocks 80-88 of FIG. 3. Block 80 is a create content stage, block 82 is a topic owner review stage, block 84 is a legal review stage, block 86 is a content validation stage, block 88 is a content approval stage, and block 90 is a promote files stage where approved content is copied to the staging server.

An additional block 90 represents an additional stage in the workflow process, where HTML coding is performed, but which does not have a separate status associated therewith (although a separate status could be used in the alternative) .involve activities that typically occur outside of the primary managed process activities.

Displayed within each block is the status and owner associated with a content management document or record when the content item and workflow process are in that particular stage. Also displayed is an action item that triggers progression to another stage in the process. Each of the stages illustrated in FIG. 3 are discussed in greater detail below.

Create Content Stage (Status=Draft, Owner=Author)

During stage 80, a content creator produces a new document. This person is considered the author of the document. As will be discussed in greater detail below, the author selects appropriate categories from those available (typically via controls such as pull-down lists). These categories are used for routing in this content management process and also for enhancing navigation and search effectiveness. When the content has been completed and is ready for review, the author submits (typically via clickable button) the document to a Topic Owner contact (Topic Owner). The author is typically responsible for checking the accuracy of spelling and grammar in their document in addition to initially making sure that their document meets some or all legal requirements (e.g. proper usage of trademarks).

Once the author submits the document, an e-mail is sent to each Topic Owner based on the selected categories for the document. All notifications to people who must take action throughout this process are typically via e-mail, or alternatively, another form of electronic communication. The e-mail typically contains a link to the specific control document requiring action.

Major Actions at this Stage

Performed by Author:
  Write content
  Enter content into system
  Select content category(ies) (domain specific "areas" for content)
  Enter title, summary and keywords
  Enter publication date
  Answer questions regarding trademark and other legal issues
  Submit content for review (click submit button)
Performed by Application:
  Identify author and populate appropriate fields (userid, etc.)
  Identify current date and populate field
  Create unique document number and populate field
  Determine topic owner(s) (based on categories) and populate field
  Add appropriate synonyms for keywords entered by author
  Determine next review and expiration dates and populate field
  Determine if legal review is necessary
  Identify next reviewer (based on workflow logic and author selections)
  Send e-mail notification to next reviewer
  Log names and actions for all parties involved in workflow process Topic Owner Review Stage (Status=Review, Owner=Topic Owner)

In stage 82, one or more topic owner reviewers ensure appropriate technical content of specific topics or categories. The reviewers for the specified functional area are responsible for technical accuracy, elimination or avoidance of duplicate information, content appropriateness for that category, adherence to the overall web page design and structure, etc. A set of questions to determine the necessity of legal review, answered by the author, can also be altered at the discretion of the reviewer. Based on those questions, the process will flow either to legal review stage 84 or content validation stage 86. If a content file is rejected by a topic owner, the file may also be returned to the author and the status returned to draft.

Major Actions at this Stage

Performed by Topic Owner:
  Review content
  Override application logic to force legal review if desired
Performed by Application:
  Log "reviewer" information and determine next actions (based on previous user selections)
  Send e-mail notification(s)

Legal Review Stage (Status=Legal, Owner=Legal Manager)

In block 84, a review is performed by a lawyer or other appropriate entity to ensure adherence to desired legal guidelines, in regards to usage of trademarks, registered names, product or performance claims, confidential information, etc. After a document has been approved by the legal manager, it is then forwarded to the content validation stage 86. If not approved, the document can be returned to draft status for further action by the author.

Major Actions at this Stage

Performed by Legal Manager:
  Evaluate content for adherence to legal guidelines
Performed by Application:
  Log "reviewer" information and determine next action.
  Send e-mail notification to next action owner.
Content Validation Stage (Status=Develop, Owner=Developer)
  In block 86, the input supplied by the author is validated for accuracy by a development team member. In addition, an initial determination is made by a development team member as to whether additional HTML coding is required (given some authors may perform all necessary coding). If coding is needed, web development activities occur as shown in block 92, and once the HTML coding is complete, the process progresses to a content approval stage (block 88). Otherwise, if no coding is required, progress to content approval stage may occur directly from block 86.
  In block 92, developers will code the document in HTML for web publication, or possibly just verify proper coding if an author has chosen to write their own code. At this stage, if meta data has not been generated for the document, meta data is automatically generated by the system. This meta data provides machine readable attributes specific for the current document. Meta data greatly enhances search capabilities and provides information necessary for ongoing review and maintenance of the content. The meta data may be generated at other stages, and furthermore, alternative information, as well as data structures, may be used to store such information.

Major Actions at this Stage

Performed by Developer:
  Write HTML (or other web page rendering programming code) to enable serving the content as desired by the author
Performed by Application:
  Build meta data for web page in desired format with attributes determined or derived from input throughout this process.
Content Approval Stage (Status=Approval, Owner=Content Manager)
  In block 88, the document is reviewed by a content manager to ensure its readiness for publication. This content manager is typically an overall "site" content manager that is responsible for ensuring site consistency and completeness. If no changes are required, the document can be approved. The document will then be moved to a status of "Available—Waiting for Promotion" or "Available—Hold", based upon whether a publish now or publish later indication was selected in the content management document for the content item. While typically an immediate publication is desired, in some instances, e.g., when a product announcement or advertising campaign, or new price structure, is planned for a particular date, withholding publication until a particular date may be beneficial.
  In addition, if an international flag is set in the content management document, one or more country owners is notified via email that a parent, main language document has been approved. The purpose of this operation is discussed in greater detail below.

Major Actions at this Stage

Performed by Content Manager:
  Ensure web site standards and overall look and feel are properly represented
Performed by Application:
  Determine next action (promote to "live" or hold for future date)
  Change status according to action
  Notify promoter of files to promote to "live"
Promote Files Stage (Status=Available-Waiting for Promotion, Owner=Promoter)
  As shown in block 92, once a document is ready to be published to the web site (promoted), an e-mail with appropriate detailed information is sent to the database administrator, or another promoter (possibly the same entity as the development team), with instructions to move this document into "live" production. At this time, the appropriate content files or items specified in the associated content management document are copied from the test server where they initially reside to the staging server. As discussed above, thereafter the update agent will copy the files to the production server at its next synchronization interval. Moreover, an email is sent to the author to notify him or her that the content has been published.
  Block 92 may either be entered via stage 88, or alternatively, if an "available-hold" status is assigned to a document, a separate, hold agent (one of database agents 74, and discussed below in connection with FIG. 11) is used to initiate content promotion at an appropriate time. When in "available-hold" status, a document remains in that status until the date that was specified in the "Web Publication Date" field is reached. On the specified date, the document then moves to "Available-Waiting for Promotion", and block 92 is initiated.

Major Actions at this Stage

Performed by person:
  Physically move content files from the test server to the staging server (This step could be alternatively be performed automatically by the content management system)
Performed by Update Agent:
  On a predetermined schedule, move the specified files from the staging server to the production server and update the content management document upon completion to show "Promoted" status
  Send e-mail notification to Author that files are now "live"
Content Management Document Format
  As discussed above, in the illustrated embodiment, a content management document is implemented in the form of a Lotus Notes document that is shared among the various entities that collaborate on a particular web site content item. In addition, groupware messaging (i.e., email) is used to notify different entities as the content management process progresses. FIGS. 4A-4C, for example, illustrate an exemplary control management document 100 consistent with the invention. In this document, text descriptions, input fields, buttons, drop-down lists, and other user input controls are integrated with associated program code (all created in the Lotus Notes development language) to provide the functionality described herein.

Document 100 includes a header 101 that includes a field 102 including a document identifier that unique identifies the content management document. Field 104 stores the author of the associated content item(s) being managed by document 100, and field 106 stores the creation date for document 100. The ability to change the author (and thus, who receives future notifications directed to an author) is supported through a control 108.

Fields 110 and 112 respectively store the current status and date of the last status change, while fields 114 and 116 respectfully store the category assigned to the document and the topic owner for that category. Field 118 stores an identifier (e.g., Notes address) for the entity from which the next action is required. Field 120 includes a field 120 that stores pointers or links to any secondary language documents associated with document 100 (discussed below).

Dispersed throughout document 100 are one or more help/instruction buttons 122 used to provide help information for an entity that is accessing the document. In addition, a radio button control 124 is provided to query an entity as to whether the document is related to a "special processing" content item. In connection with a special processing item, alternate functionality (e.g., special defaults, special input fields, constrained input options, etc.) may be defined to handle special circumstances. For example, where a major product release is contemplated, it may be useful to define a default publication date so that any content items associated with the product will be published on the same day. Other situations that might warrant special processing might includes marketing campaigns, special events such as business shows and seminars, urgent items, etc.

After header 101, a number of field groups 125, 132, 142, 160, 170, 190, 194, 198, and 210 may be provided, with each field group representing a sequential "step" taken by an author when inputting the necessary content management information.

Field groups 125 and 132, for example, request topic area information, thus defining the topic owners that require notification and approval in the workflow process. Field group 125 includes a primary topic stored in field 126, an industry topic stored in field 128 and a country list stored in field 130. Field group 132 includes a list of other topics in field 134, as well as a number of yes/no radio buttons 136, 138 and 140 that respectfully note whether the content is associated with a shopping site, a system sales site, and a business partner information site.

Through the combination of fields in groups 125 and 132, a number of topics/categories are associated with content items managed by the document. In addition, through preset association of topics and categories with specific topic owners (defined elsewhere in the content management system), a list of entities from which review and approval is required can be generated. Thus, during the review stage, document 100 is analyzed to determine which entities must be notified of a content, and which must provide approval prior to promotion of the content. It should be noted that the list and stratification of topics shown in document 100 is specific to the particular implementation disclosed herein, and may vary for different applications, or where different entities have different responsibilities for web site content.

Field group 142 includes a number of fields that provide descriptive information about content being managed by the document. Field 144 provides a short title, and field 146 provides a short summary. Field 148 provides one or more keywords that are searchable through the Lotus Notes search facilities, and field 150 stores an international flag that indicates whether the content is world wide in scope, and needs approval and/or customization from entities in other countries or regions. As discussed above, the state stored in field 150 is used when determining whether to initiate an international review process. Moreover, field 148 is typically manually filled with keywords, although in some implementations synonyms to manually selected keywords may automatically be added to the field by the application.

Next, as shown in FIG. 4B, field group 160 permits publication, review, and expiration dates to be specified by an author or other entity. Field 162, for example, specifies whether content is to be published (promoted) immediately upon approval, or at a specific date after approval is obtained. Field 164 stores the relevant publication date whether a specific date is specified in field 162. Field 166 stores a review date, specifying when an expiration process will begin so that an author will reinstitute review of an existing document. Field 168 stores an expiration date, defined after the review date, defining when content items will be removed from the web site if review is not completed in a timely fashion. Any of fields 164-168 may be constrained to certain ranges if desired.

Field group 170 provides a number of queries that assist an author in determining whether legal review is required. Field 172 queries whether the content is already approved by legal, and field 174 stores the name of the entity completing such a review. Fields 176, 178, 180, 182 and 184 ask a number of questions pertaining to potential liability risks posed by content, e.g., whether comparative claims are being made, whether confidential information is being disclosed, whether performance claims are being made, whether unannounced information is being released, and whether market share or other competitive data is being released. Logic in the application take the answers to these queries to determine whether legal review is required, e.g., if any of queries 176-184 has a "yes" result and legal review has not yet been obtained.

Field groups 190 and 194 enable content to be associated with an identified file within the content management document. Field group 190 includes a field 192 where the specific content files being added, changed or deleted are identified. Field 196 permits an author to specify the content changes being made (predominantly for where existing content is being modified).

Field group 198 includes a comment field 200 that maintains a running dialog between team members throughout the review process, e.g., so reviewers can inform an author of modifications that are required, among other collaborative purposes. Typically, each entry in field 200 includes a user name, timestamp, and comment. An entity is also able to add a new content manually through interaction with button 202.

Next, as shown in FIG. 4C, field group 210 provides a number of fields 212, 214 and 216 that store contact information for the author, in particular an external phone number, internal phone line, and fax number.

Figure 5:
FIGS. 5-10 illustrate suitable role-specific controls to be incorporated into the content management document of FIGS. 4A-4C respectively for an author, a topic reviewer, a developer, a legal reviewer, a content manager, and a promoter.

Below field group 210 is provided a region of role-specific controls, which are controllably displayed in the document based upon the "role" of the entity viewing the document at a particular time. These different role-specific controls are illustrated in FIGS. 5-10. As shown in FIG. 5, for example, the controls displayed to an author includes a "submit for review" button 250 that is selected when an author wishes to submit the document for review. Button 252 permits the document to be saved and closed, without submitting the document for review. Button 254 is an optional button that permits the author to build a country specific page or document.

Figure 6:
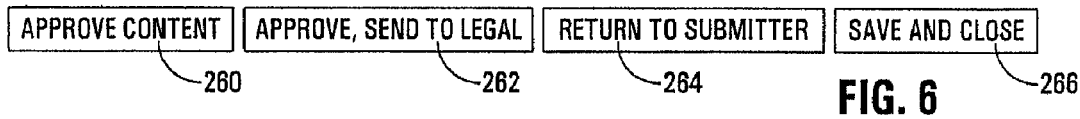

FIG. 6 illustrates the controls presented to a reviewer, including an "approve content" button 260 used to note the reviewer's approval of the content, and an "approve, send to legal" button 262 used to note the reviewer's approval, but also forward the document to legal for additional review (regardless of the status of the queries in field group 170 of FIG. 4B). Also, a "return to submitter" button 264 is used to return the document to the author, and return the document status to "draft," and a "save and close" button 266 is used to save and close without changing the current stage or ownership of the document.

Figure 7:
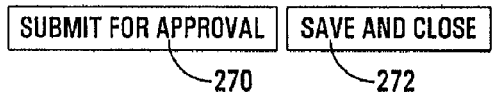

FIG. 7 illustrates the controls presented to a developer, including a "submit for approval" button 270 used to pass control to the approval stage, and a "save and close" button 272 used to save and close without changing the current stage or ownership of the document.

Figure 8:
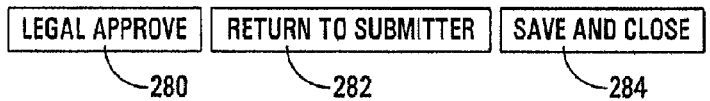

FIG. 8 illustrates the controls presented to a legal manager, including a "legal approve" button 280 used to note the manager's approval of the content, and a "return to submitter" button 282 used to return the document to the author, and return the document status to "draft." A "save and close" button 284 is used to save and close without changing the current stage or ownership of the document.

Figure 9:

FIG. 9 illustrates the controls presented to a content manager, including an "approve, no changes" button 290 used to note the manager's approval of the content, and a "return to development" button 292 used to return the document to the development team, and return the document status to "develop." A "reset status" button 294 may also be provided to permit the content manager to return the document to any desired status (e.g., "draft" status). In connection with resetting status, the author is typically notified via email.

Figure 10:

Next, as shown in FIG. 10, a single control, "notify author" button 295, may be presented to a promoter so that the author identified in the document can be notified via email when the content associated therewith has been promoted and published to the web site.

Now returning to FIG. 4C, after the role-specific controls, a generate META data button 222 may be provided to generate or regenerate standardized META data for any content item associated with the document, with the META data storing relevant content management information stored in the document, as shown in field 224. For example, it may be desirable to add META tags for title, summary, abstract, keywords, review date, author, security information, expiration date, industries, document number, contact, last update date, creation date, country code, language code, and other data as may be deemed necessary. It will be appreciated that such data generation typically incorporates little more than simply extracting desired information from document 100 and generating properly formatted tags therefrom. However, it is desirable to ensure that only automated META data generation is supported, so that all content items will have similarly-formatted META regions, thus permitting global search and replace operations and the like.

Field 226 provides an input for the Uniform Resource Locator (URL) for the content file and/or root directory therefor on the test server. Field 228 provides an input for a list of all content items or files associated with document 100, which is in contrast to field 192 (FIG. 4B), which only lists those items or files that have been modified from a previous version of the content.

Document 100 also includes an activity log region 230, including log entries 232, 236, 238, 240 and 242 to log the respective activities of the author (submitter), topic owner(s), legal manager, developer, and content manager. Each entry typically includes the identity or user name of the entity associated with the entity, and a date/timestamp indicating the time and day of the logged entry.

It will be appreciated that different formats and combination of information, input fields and user interface controls may be integrated into a content management document or record consistent with the invention. For example, while not explicitly shown in FIGS. 4A-4C, document 100 may also include one or more active links to the content items covered thereby, e.g., so that an entity opening document 100 can quickly access the content at issue. Thus, the invention is not limited to the particular implementation of document 100 as shown herein.

Available-Hold Publication Process

Figure 11:
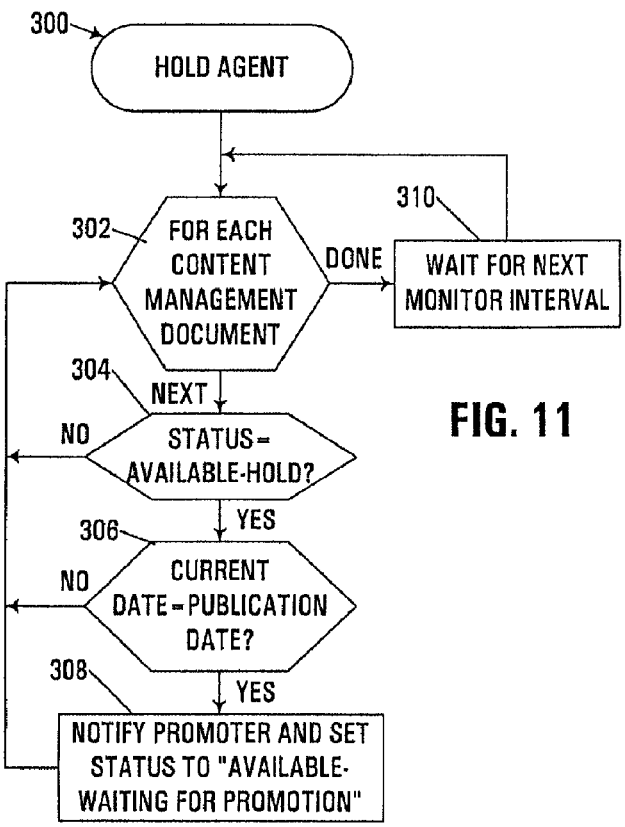
FIG. 11 illustrates the program flow of a hold agent in the database agent pool of FIG. 3.

Returning to FIG. 3, whenever a predetermined publication date is desired for a particular content item, it may be desirable to specify such a date in the content management document associated therewith. In connection with the specified date, the content management system is configured to set the document to a status of "available-hold" after final approval but prior to the publication date. To enable timely publication, a hold agent 300, illustrated in greater detail in FIG. 11, is provided as one of the database agents.

Hold agent 300 operates by periodically polling all documents having an "available-hold" status to detect those documents that have reached their appropriate publication dates. As such, agent 300 may be considered to operate in a loop 302 that periodically scans through all content management documents in the system. For each such document, block 304 determines whether its status is "available-hold." If not, control returns to block 302 to process other documents. Otherwise, control passes to block 306 to determine whether the current date is the same as the publication date stored in the document. If so, block 308 is executed to notify the promoter to promote the content associated with the document, and to set the status of the document to "available-waiting for promotion". Control then passes to block 302 to process additional documents. If the current date is not the same as the publication date, block 308 is bypassed, and control passes directly to block 302. Once all documents have been processed, block 302 passes control to block 310 to wait for a next monitoring interval (e.g., the next day), then scanning of all documents is restarted for the next interval.

Document Review and Expiration Process

Returning again to FIG. 3, once a document is moved to "Available-Promoted," the document is published to the web site and can remain published without review (without any editing being done to it) for a specified period of time (e.g., a maximum of 1 year). The review date can be set as appropriate for each document. If the document remains untouched (that is, no editing has been done to it) past the review date, the document then enters an expiration process that lasts another set period of time. This is a separate workflow process specific to the review and maintenance of this content, and is managed by an additional pair of agents, review agent 320 of FIG. 12 and expiring agent 340 of FIG. 13.

Within the expiration process, the document will typically not be removed from its designated web site(s). However, the document is returned to the author to take immediate action. Once the author starts to take action on the document, the status of the control document is reverted to "draft" (in the workflow process only), thus starting the review and approval process as described above.

During this stage, the author will typically receive periodic e-mail notifications until they complete the update, to warn them that their document is in danger of being deleted if action isn't promptly taken. If the author does not take appropriate action in a specified time frame, the Reviewer (Topic Owner) may also be notified. This is to ensure proper action is taken, even if the author is unresponsive.

If no action is taken on an expiring document for the maximum expiration period, it is subject to deletion.

Figure 12:
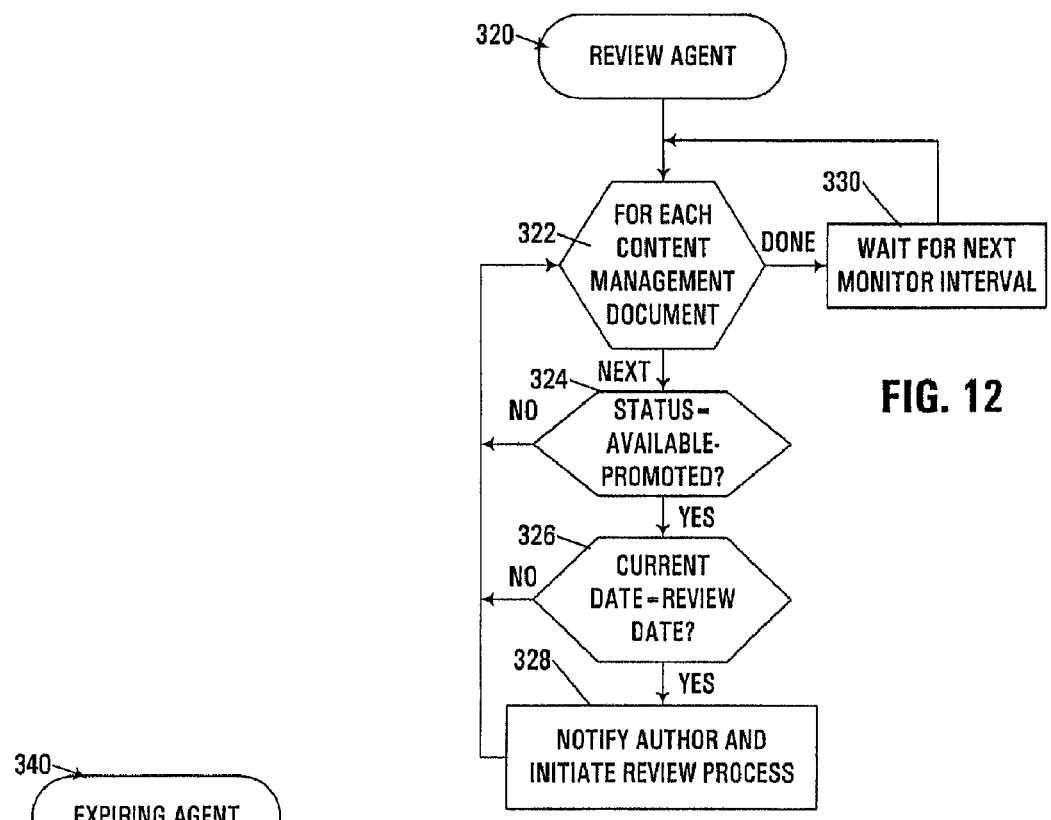
FIG. 12 illustrates the program flow of a review agent in the database agent pool of FIG. 3.

FIG. 12 illustrates the operation of one embodiment of review agent 320 in greater detail. Review agent 320 operates by periodically polling all documents having an "available-promoted" status to detect those documents that have reached their appropriate review dates. As such, agent 320 may be considered to operate in a loop 322 that periodically scans through all content management documents in the system. For each such document, block 324 determines whether its status is "available-promoted." If not, control returns to block 322 to process other documents. Otherwise, control passes to block 326 to determine whether the current date is the same as the review date stored in the document. If so, block 328 is executed to notify the author and initiate a review process and essentially "re-certify" the content. Control then passes to block 322 to process additional documents. If the current date is not the same as the review date, block 328 is bypassed, and control passes directly to block 322. Once all documents have been processed, block 322 passes control to block 330 to wait for a next monitoring interval (e.g., the next day), then scanning of all documents is restarted for the next interval.

Figure 13:
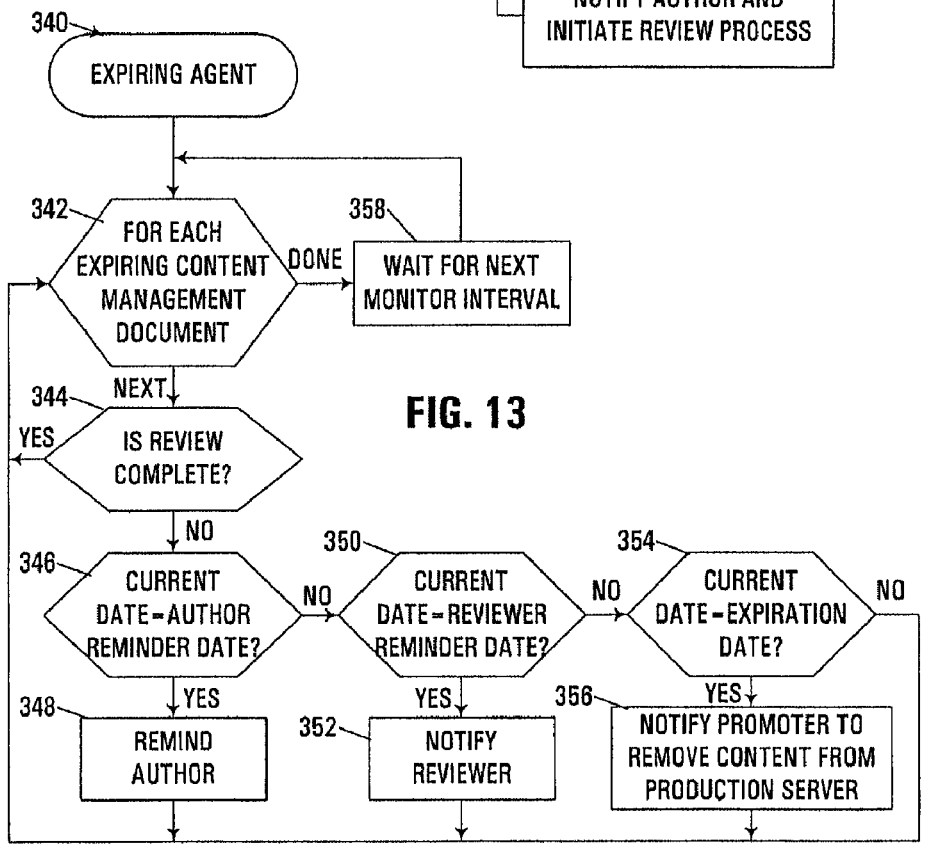
FIG. 13 illustrates the program flow of an expiring agent in the database agent pool of FIG. 3.

FIG. 13 illustrates the operation of one embodiment of expiring agent 340 in greater detail. Expiring agent 340 operates by periodically polling all documents currently in the review process initiated by agent 320, and performing actions at different points in time to encourage completion of the reviews in a timely fashion. As such, agent 340 may be considered to operate in a loop 342 that periodically scans through all content management documents in the system. For each such document, block 344 determines whether a review process initiated for that document (if any) has been completed. If so, control returns to block 342 to process other documents. Otherwise, control passes to block 346 to determine whether the current date is the same as an author reminder date for the document. If so, block 348 is executed to remind the author (e.g., via a reminder email). Control then returns to block 342 to process additional documents.

If the current date is not the same as the author reminder date, block 346 passes control to block 350 to determine whether the current date is the same as a reviewer reminder date for the document. If so, block 352 is executed to notify the reviewer of the status of the non-review (e.g., via an email). Control then returns to block 342 to process additional documents.

If the current date is not the same as the reviewer reminder date, block 350 passes control to block 354 to determine whether the current date is the same as an expiration date stored in the document. If so, block 356 is executed to notify the promoter to remove the now-expired content items from the production server (e.g., by removing them from the staging server prior to a synchronization operation). Control then returns to block 342 to process additional documents. If block 354 results in a "no" result, block 356 is bypassed, and control returns directly to block 342. Once all documents have been processed, block 342 passes control to block 358 to wait for a next monitoring interval (e.g., the next day), then scanning of all documents is restarted for the next interval.

In the illustrated embodiment, the review and expiration dates are set by the author or another entity and stored in the content management document. One or more author and reviewer reminder dates, however, are typically derived from these stored dates. For example, one author reminder may be scheduled for delivery 7 days after the review date, and one reviewer reminder may be scheduled for delivery 14 days after the review date. In the alternative, any of the dates described herein may be derived or independently controlled in various embodiments.

International Process

Along with the aforementioned stages discussed above, it may also be desirable to incorporate an international process for content that is deemed as potential for country-specific updates. Authors can indicate in their submission (and later in the process a reviewer can modify) whether or not the content should be routed to selected country owners associated with various countries, regions, or languages around the world. The country owners will receive the content and route it to developers in their respective country (or the same developer team used in the primary language document) for purposes of marking it up (in HTML) and translating it into an appropriate country's national language (if necessary).

Countries or regions may be defined by political boundaries, enterprise distribution or business group boundaries, language boundaries, etc., and it may or may not be required for a particular country or region-specific content item to be translated from its native language. In the interest of simplicity, however, the term "country" when used with respect to a country page, country document or country owner will be used to refer to a particular country, region, or language.

In the illustrated implementation, content items associated with different countries are distinguished as parent and child items, where the parent relates to a primary country (e.g., the US for a US-based enterprise), and the child items relate to other countries. The content management system is configured to link child items to a parent item, and to incorporate functionality that automatically notifies owners of child items in response to changes made to a parent item. For example, a review process may be initiated for child items automatically in response to a modification to a parent item. The parent and child items may also be considered to be different country versions of the same content item in the alternative.

Figure 14:
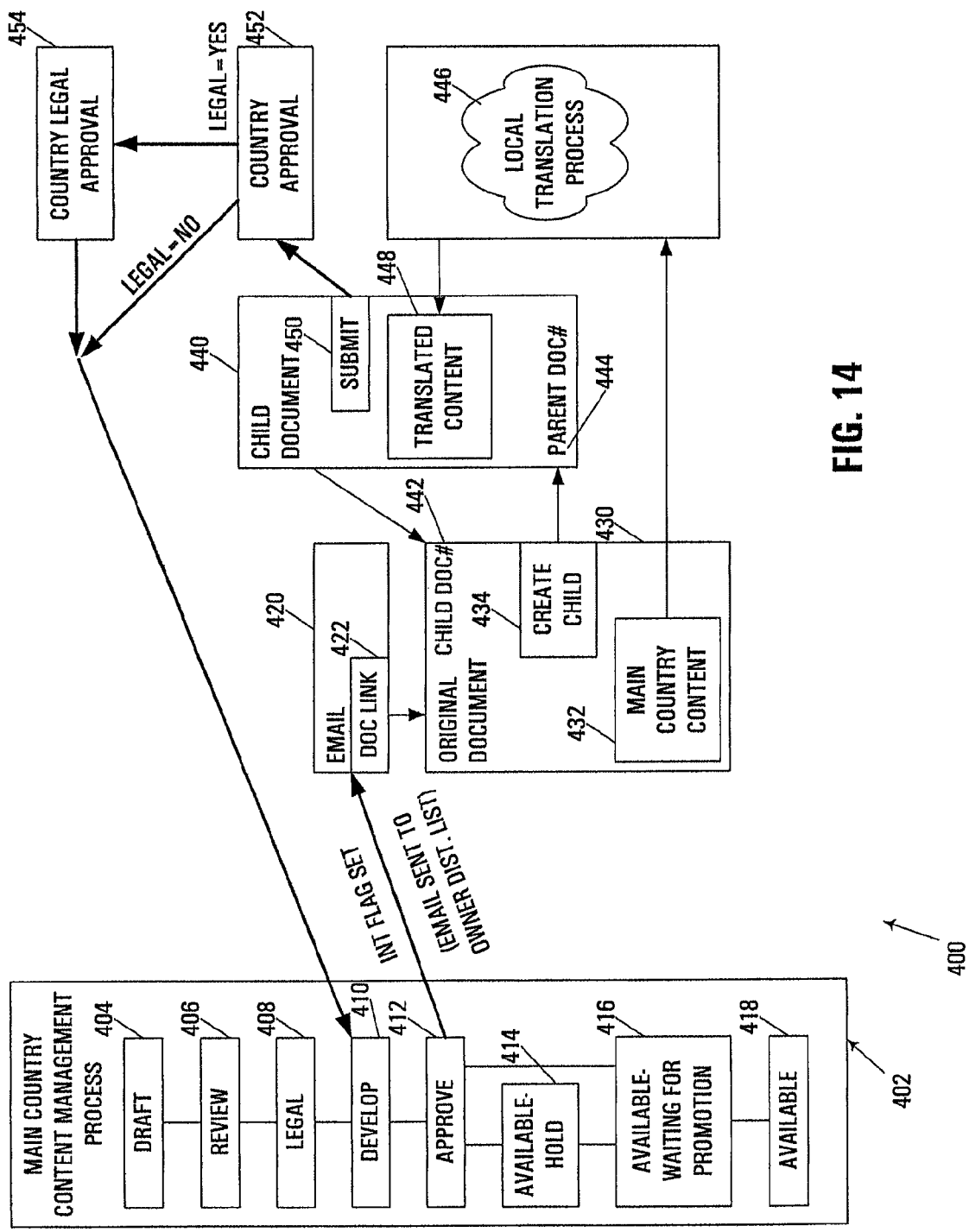
FIG. 14 is a block diagram illustrating additional international-related stages in the content management process of FIG. 3.

FIG. 14 illustrates one possible implementation of an international content management system 400 consistent with the invention. As with the embodiment discussed above, system 400 includes a primary country process 402 that supports various stages 404-418 for each content management document, including a draft stage 404, review stage 406, legal stage 408, develop stage 410, approve stage 412, available-hold stage 414, available-waiting for promotion stage 416 and available (promoted) stage 418.

As represented by the arrow to email 420 from approve stage 412, whenever a content manager approves a content item, if some indication is noted in the content management document that international processing is required, an email is initiated to a designated country owner for each country specified in the content management document. The indication of the need for international processing may occur, for example, based upon the information stored in any of fields 120, 130, and 150.

For each country owner, the email sent thereto includes a document link 422 that references the original document 430, which is shown related to a main country content file 432. Once the country owner, or even the original author or any other interested party decides that a county-specific content file is needed, a create child process 434 is initiated on the original document, resulting in the creation of a child document 440. Child and parent document numbers 442 and 444 link the respective parent and child documents.

Once a child document is created, some form of local translation process 446 is performed to conform the original content to a format that is appropriate for the specific country. Such conformance may including language translation, currency and measurement unit conversion, look and feel formatting, each of which including manual and/or automated processes. The result of process 446 is translated content 448 maintained in relation to child document 440.

Once the translated content is created and the child document is authored as with the original document, a submit process 450 is initiated by a content owner or author to forward the child document on for country-specific review 452. Moreover, based upon whether a legal review is required, a country-specific legal review 454 may also be performed. The child document may then be transitioned to the develop stage 410 for formatting by a web development team.

Another key aspect of international support is the ability to link main and alternate country-specific content so that an update to the main content can initiate, in the least, notification of a country owner, and optionally, automated initiation of a review process for any country-specific content. Thus, for example, if a main country content item is detected as being modified, it may be desirable to automatically notify any country owners identified in the associated document. Such a notification may be initiated in response to the return of a content item to a non-promoted status, or may be deferred until the content item is actually modified. A review process similar to that shown in blocks 452 and 454 of FIG. 14 may therefore be initiated in each appropriate country.

Various additional modifications will be apparent to one of ordinary skill in the art. Therefore, the invention lies in the claims hereinafter appended.

What is claimed is:

1. A method of managing content in a content-controlled database, the method comprising:
   detecting a modification made to a first country version of a content item in the content-controlled database; and
   automatically initiating a review of a second country version of the content item in the content-controlled database in response to detecting the modification of the first country version;
   wherein the first and second country versions of the content item are respectively linked to first and second content management records, each of which including content management information associated with the country version of the content item linked thereto, wherein detecting the modification is performed during processing of the first country version of the content item through a plurality of stages of a content management process, wherein the content management information stored in the first content management record is updated during each stage of the content management process, wherein automatically initiating the review of the second country version includes demoting the second country version to restrict the content item from being user accessible from the content-controlled database, wherein prior to the automatically initiated review the second country version is accessible to end users of a web site that uses the content-controlled database, and wherein demoting the second country version includes restricting access to the second country version by end users via the web site until after approval of the second country version is obtained via the automatically initiated review.

2. The method of claim 1, wherein automatically initiating the review of the second country version includes notifying an entity responsible for the second country version of the content item.

3. The method of claim 1, wherein the first and second country versions of the content item differ in terms of at least one of language, country and region.

4. An apparatus, comprising:
   at least one processor; and
   program code configured to be executed by the processor to manage content in a content-controlled database by detecting a modification made to a first country version of a content item in the content-controlled database, and automatically initiate a review of a second country version of the content item in the content-controlled database in response to detecting the modification of the first country version;
   wherein the first and second country versions of the content item are respectively linked to first and second content management records, each of which including content management information associated with the country version of the content item linked thereto, wherein the program code is configured to detect the modification during processing of the first country version of the content item through a plurality of stages of a content management process, wherein the content management information stored in the first content management record is updated during each stage of the content management process, wherein the program code is configured to automatically initiate the review of the second country version by demoting the second country version to restrict the content item from being user accessible from the content-controlled database, wherein the program code is accessible to end users of a web site that uses the content-controlled database prior to the automatically initiated review of the second country version, and wherein the program code is configured to demote the second country version by restricting access to the second country version by end users via the web site until after approval of the second country version is obtained via the automatically initiated review.

5. The apparatus of claim 4, wherein the program code is configured to automatically initiate the review of the second country version by notifying an entity responsible for the second country version of the content item.

6. The apparatus of claim 4, wherein the first and second country versions of the content item differ in terms of at least one of language, country and region.

7. A program product, comprising:
   a recordable computer readable medium; and
   program code resident on the computer readable medium and configured to manage content in a content-controlled database by detecting a modification made to a first country version of a content item in the content-controlled database, and automatically initiate a review of a second country version of the content item in the content-controlled database in response to detecting the modification of the first country version;
   wherein the first and second country versions of the content item are respectively linked to first and second content management records, each of which including content management information associated with the country version of the content item linked thereto, wherein the program code is configured to detect the modification during processing of the first country version of the content item through a plurality of stages of a content management process, wherein the content management information stored in the first content management record is updated during each stage of the content management process, wherein the program code is configured to automatically initiate the review of the second country version by demoting the second country version to restrict the content item from being user accessible from the content-controlled database, wherein the program code is accessible to end users of a web site that uses the content-controlled database prior to the automatically initiated review of the second country version, and wherein the program code is configured to demote the second country version by restricting access to the second country version by end users via the web site until after approval of the second country version is obtained via the automatically initiated review.

8. The program product of claim 7, wherein the program code is configured to automatically initiate the review of the second country version by notifying an entity responsible for the second country version of the content item.

9. The program product of claim 4, wherein the first and second country versions of the content item differ in terms of at least one of language, country and region.

10. The method of claim 1, wherein the web site is accessible over the Internet, and wherein the end users include end users lacking heightened security rights to the controlled-content database.

11. The method of claim 1, wherein disabling access to the second country version includes removing the second country version from a production server for the web site.

12. The apparatus of claim 4, wherein the web site is accessible over the Internet, and wherein the end users include end users lacking heightened security rights to the controlled-content database.

13. The apparatus of claim 4, wherein the program code is configured to disable access to the second country version by removing the second country version from a production server for the web site.

14. The program product of claim 7, wherein the web site is accessible over the Internet, and wherein the end users include end users lacking heightened security rights to the controlled-content database.

15. The program product of claim 7, wherein the program code is configured to disable access to the second country version by removing the second country version from a production server for the web site.

* * * * *